US011574376B2

(12) United States Patent
McAllister et al.

(10) Patent No.: US 11,574,376 B2
(45) Date of Patent: Feb. 7, 2023

(54) PACKAGING SYSTEMS AND METHODS

(71) Applicant: United Parcel Service of America, Inc., Atlanta, GA (US)

(72) Inventors: Minda McAllister, Atlanta, GA (US); Sue Burton, Atlanta, GA (US); Adolfo Ceballos, Atlanta, GA (US); Matthew Major, Atlanta, GA (US); Eileen Webb, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 971 days.

(21) Appl. No.: 16/279,651

(22) Filed: Feb. 19, 2019

(65) Prior Publication Data

US 2019/0259119 A1 Aug. 22, 2019

Related U.S. Application Data

(60) Provisional application No. 62/710,432, filed on Feb. 16, 2018.

(51) Int. Cl.
G06Q 50/28 (2012.01)
G06F 3/0482 (2013.01)
G06Q 10/06 (2012.01)
G06V 10/42 (2022.01)
H04N 13/204 (2018.01)

(52) U.S. Cl.
CPC ........... *G06Q 50/28* (2013.01); *G06F 3/0482* (2013.01); *G06Q 10/06316* (2013.01); *G06V 10/42* (2022.01); *H04N 13/204* (2018.05)

(58) Field of Classification Search
CPC ..................................... G06Q 50/28
USPC ........................................... 705/332
See application file for complete search history.

(56) References Cited

U.S. PATENT DOCUMENTS

| 2017/0253354 | A1* | 9/2017 | Colson | B65B 61/007 |
| 2018/0211444 | A1* | 7/2018 | Shaviv | G06T 19/006 |
| 2018/0276319 | A1* | 9/2018 | Tierney | G06F 30/13 |
| 2019/0188477 | A1* | 6/2019 | Mair | G06V 20/64 |

* cited by examiner

Primary Examiner — Ruay Ho
(74) Attorney, Agent, or Firm — Shook, Hardy & Bacon L.L.P.

(57) ABSTRACT

Systems and methods for providing a packaging instruction are disclosed. Sensor data of an item to be packaged is captured. The item is identified based on one or more detectable features. The item is determined to be associated with a plurality of item-specific characteristics that require different packaging materials. A plurality of user interface elements comprising the plurality of the item-specific characteristics is presented. A selection of one of the plurality of item-specific characteristics is received. An alternative packaging instruction associated with the received selection of the one of the plurality of item-specific characteristics is presented.

20 Claims, 11 Drawing Sheets

PACKAGING SYSTEMS AND METHODS

This application claims priority to Provisional Application 62/710,432 filed on Feb. 16, 2018, entitled "Packaging Systems and Methods". The provisional application is incorporated in its entirety herein.

TECHNICAL FIELD

The technical field relates to packing systems and methods.

BACKGROUND

Packing systems and methods are critical to ensuring an item within a parcel arrives undamaged at its destination. Everything from the size of the parcel to the cushioning material itself will minimize any risk of the item being damaged as it is transported. Given that packaging items is a tedious and subjective process, it is a process that is prone to failure. For example, the item may be damaged during the shipment process at no fault of the carrier, but based on poor packaging procedures or using the wrong type of cushioning materials. Even more, packing the item according to certain guidelines could be critical to obtaining insurance coverage. For example, insurance coverage may require that the item be packed according to certain guidelines before it guarantees coverage of any claims.

SUMMARY

This summary is provided to introduce a selection of concepts in a simplified form that are further described below in the detailed description section of this disclosure. This summary is not intended to be used to identify key or essential features of the claimed subject matter, and it is not intended to be used as an aid in determining the scope of the claimed subject matter.

In brief, and at a high level, this disclosure describes, among other things, systems and methods for providing accurate packaging procedures in near real time. In an exemplary embodiment, an image of an item is captured by a sensor. Based on the captured image, a processor identifies the item based one or more detectable features. The processor may also determine item-specific characteristics. Based on the item-specific characteristics, the processor determines if a conflict in how the item should be packaged exists, as a plurality of item-specific characteristics may require different packaging instructions or materials. As such, the item-specific characteristics are associated with an alternative packaging instruction that utilizes packaging materials suited for the item-specific characteristic. A graphical user interface may be utilized to present a plurality of user interface elements showing the plurality of item-specific characteristics to solicit further information about the item to be packed. The item-specific characteristic is determined based on receiving a selection of the user interface elements. Alternative packaging instructions associated with the selected item-specific characteristic are retrieved. The alternative packaging instructions are then displayed for the item. In some embodiments, the graphical user interface allows input of customized packaging instructions or item-specific characteristic that may be incorporated into the knowledge base.

In addition, embodiments described herein allow a user to send an item to a recipient based on an accurate cost of shipment to send the item, which can be presented prior to dropping the item off at a carrier's shipping location. Conventional technology generally only requires an item's dimensions, weight, and destination to provide an estimates cost of shipment. However, providing an accurate quote requires more than the item's dimensions, weight, and destination address. As such, conventional technology often leads to inaccurate estimates in pricing once the item is dropped off at a carrier's shipping location. For instance, based on the characteristics of the item (such as if it is made of glass), the shipping price may change due to the packaging material required to prepare the item for shipment. As such, embodiments may overcome at least some of the problems associated with conventional technology.

BRIEF DESCRIPTION OF THE DRAWINGS

Embodiments of the present invention are described in detail below with reference to the attached drawing figures, wherein.

DETAILED DESCRIPTION

Figure 1:
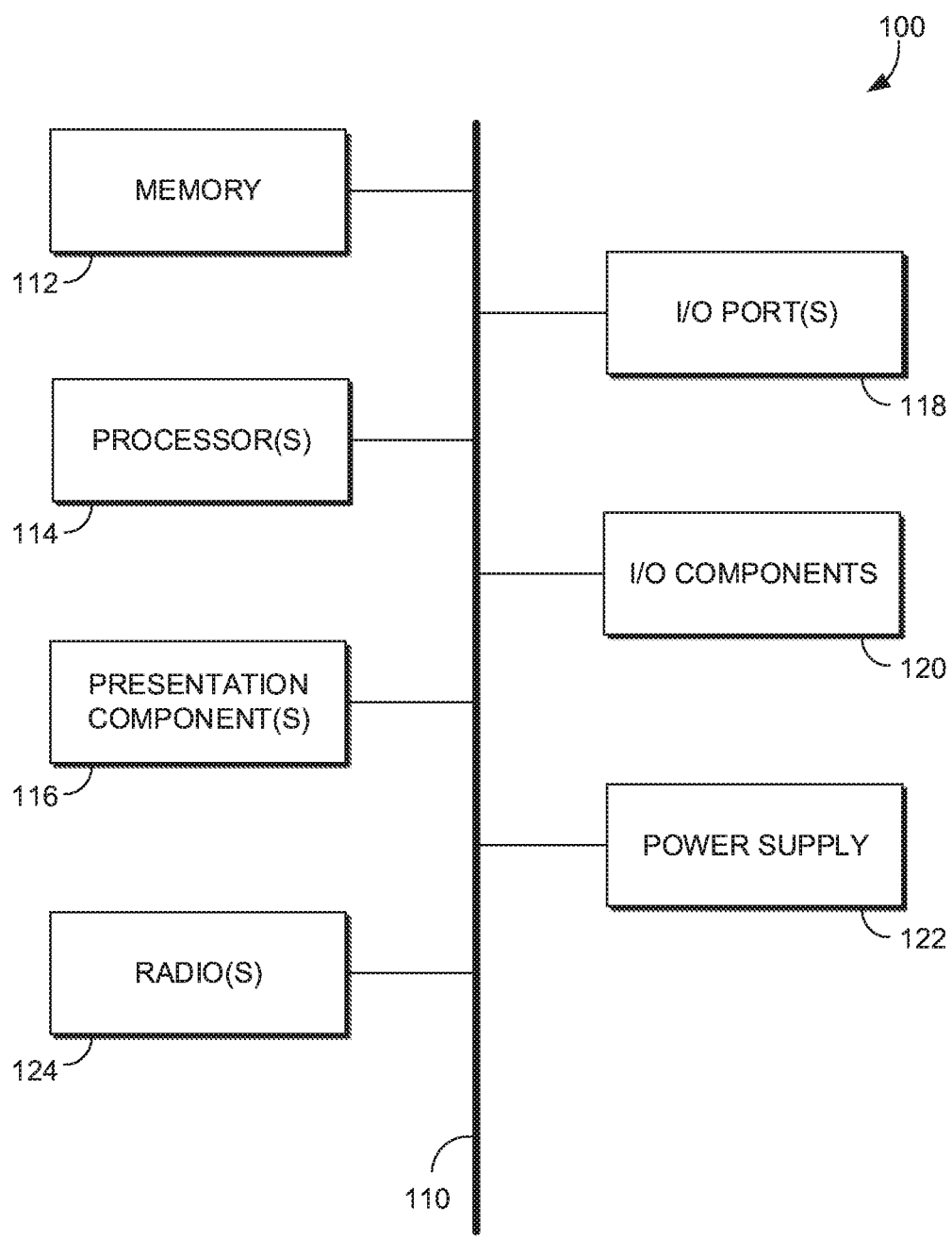
FIG. 1 is a block diagram of an exemplary computing system, in accordance with embodiments described herein.

The subject matter of the present disclosure is described with specificity herein to meet statutory requirements. However, the description itself is not intended to limit the scope of the technology. Rather, the claimed subject matter might be embodied in other ways, to include different steps, or combinations of steps, similar to the ones described in this disclosure, and in conjunction with other present or future technologies. Moreover, although the terms "step" or "block" may be used herein to describe different elements of methods employed, the terms should not be interpreted as implying any particular order among or between such steps or blocks unless the order of individual steps or blocks is explicitly described and required.

At a high level, embodiments described herein are capable of identifying an item from sensor data based on one or more detectable features and determining at least one item-specific characteristic. These determinations allow for packaging instructions to be retrieved for the item-specific characteristic from a knowledge base. The packaging instructions may include information related to packaging materials, such as an external packaging container and an interior packaging material, and directions for packing the particular item within the packaging container. In one embodiment, custom packaging instructions may be added to or updated in the knowledge base.

In some embodiments, a method is provided for preparing items to be shipped in a logistics network, including receiving an image of an item captured by a three-dimensional camera. The method includes, based on the captured image, determining, via the processor, a packaging instruction associated with the item. Further, the method includes determining, via the processor, a conflict between packaging instructions based on the item being associated with a plurality of item-specific characteristics, wherein the plurality of item-specific characteristics are associated with alternative packaging instructions that utilize different packaging materials. The method also includes causing for display, within a graphical user interface, a plurality of user interface elements for the plurality of item-specific characteristics. The method also includes determining a selected item-specific characteristic based on receiving a selection of a user interface element from the plurality the user interface elements. The method also includes retrieving, from the knowledge base, at least one alternative packaging instruction from the alternative packaging instructions associated with the item. The method further includes causing the packaging instructions for the item to be displayed.

In some embodiments, a system is provided for preparing items to be shipped. This system includes a knowledge base comprising a plurality of alternative packaging instructions for an item, the plurality of alternative packaging instructions being associated with an item-specific characteristic, wherein each of the plurality of alternative packaging instructions comprise a particular workflow for a particular packaging material. The system also includes one or more non-transitory computer-readable media having computer-executable instructions embodied thereon. The instructions include receiving, from a sensor, sensor data of the item to be packaged. The instructions also include identifying, from the sensor data, the item based on one or more detectable features. The instructions also include determining that the item is associated with a plurality of the item-specific characteristics requiring conflicting packaging materials. The instructions also include presenting, within a graphical user interface, a plurality of user interface elements associated with the plurality of the item-specific characteristics. The instructions also include receiving a selection of the plurality of the item-specific characteristics via a user interface item. The instructions also include presenting, within the graphical user interface, an alternative packaging instruction associated with the particular workflow and the particular packaging material corresponding to the received selection of the item-specific characteristic.

In other embodiments, a non-transitory computer readable storage medium having one or more computer executable instructions that cause a processor to perform a method for preparing items to be shipped. The method includes capturing, from a sensor, sensor data of an item to be packaged. The method also includes identifying, from the sensor data, the item based on one or more detectable features. The method may further include determining that the item is associated with a plurality of item-specific characteristics that require different packaging materials. On a graphical user interface, a plurality of user interface elements comprising the plurality of the item-specific characteristics are presented. The method also includes receiving, via the graphical user interface, a selection of the plurality of item-specific characteristics. An alternative packaging instruction associated with the received selection of the item-specific characteristic is presented within the graphical user interface, where the alternative packaging instruction identifies packaging materials comprising an external packaging container and internal packaging material.

As described, this disclosure relates to preparing items to be shipped in a logistics network. The subject matter of this disclosure may be provided as, among other things, a method, a system, and/or a computer-readable storage medium. Accordingly, embodiments herein may take the form of hardware, or may be a combination of software and hardware. A computer-program that includes computer-useable instructions embodied on one or more computer-readable media may also be used. The subject matter of the present disclosure may further be implemented as hard-coded into the mechanical design of computing components and/or may be built into a system for providing packing instructions.

Computer-readable media may include volatile media, non-volatile media, removable media, and non-removable media, and may also include media readable by a base, a switch, and/or various other network devices. Network switches, routers, and related components are conventional in nature, as are methods of communicating with the same, and thus, further elaboration is not provided. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Referring initially to FIG. 1, a block diagram of an exemplary computing device 100 suitable for providing packing instructions is provided, in accordance with an embodiment of the technology. It should be noted that although some components depicted in FIG. 1 are shown in the singular, they may be plural, and the components may be connected in a different, including distributed, configuration. For example, computing device 100 might include multiple processors and/or multiple radios. As shown in FIG. 1, computing device 100 includes a bus 18 that may directly or indirectly connect different components together, including memory 112, processor(s) 114, presentation component(s)

116 (if applicable), radio(s) 124, input/output (I/O) port(s) 112, input/output (I/O) component(s) 120, and power supply 122.

Memory 112 may take the form of the memory components described herein. Thus, further elaboration will not be provided here, but it should be noted that memory 112 may include any type of tangible medium that is capable of storing information, such as a database. A database may include any collection of records, data, and/or other information. In one embodiment, memory 112 may include a set of computer-executable instructions that, when executed, facilitate various functions or steps disclosed herein. These instructions will variously be referred to as "instructions" or an "application" for short. Processor 6 may actually be multiple processors that may receive instructions and process them accordingly. Presentation component 8 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or even a lighted keyboard).

Radio 124 may facilitate communication with a network, and may additionally or alternatively facilitate other types of wireless communications, such as Wi-Fi, WiMAX, LTE, Bluetooth, and/or other VoIP communications. In various embodiments, the radio 124 may be configured to support multiple technologies, and/or multiple radios may be configured and utilized to support multiple technologies.

Input/output (I/O) ports 118 may take a variety of forms. Exemplary I/O ports may include a USB jack, a stereo jack, an infrared port, a firewire port, and/or other proprietary communications ports. Input/output (I/O) components 120 may comprise one or more keyboards, microphones, speakers, touchscreens, and/or any other item useable to directly or indirectly input data into the computing device 100. Power supply 122 may include batteries, fuel cells, and/or any other component that may act as a power source to supply power to computing device 100 or to other components.

Figure 2A:
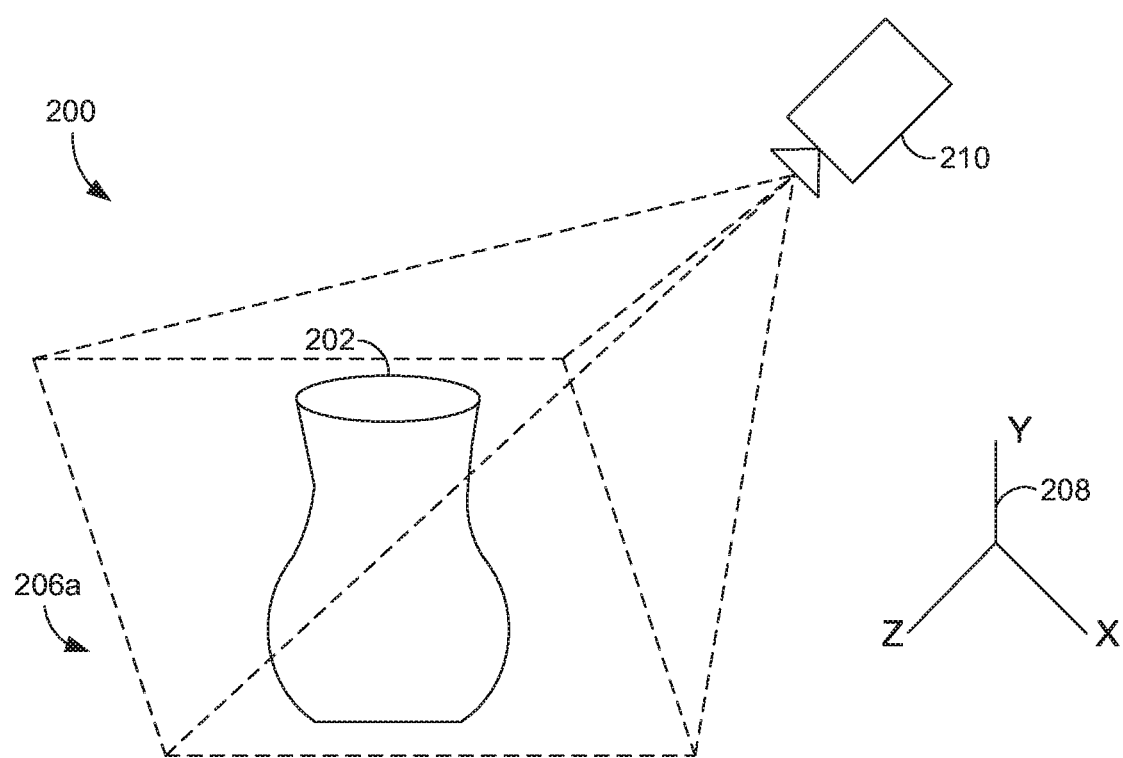
FIGS. 2A-2B are block perspective views of an exemplary feature detection zone, in accordance with embodiments described herein.

Turning now to FIG. 2A, a perspective view of a sensor capturing sensor data of an item 202 is shown in accordance with embodiments described herein. One or more sensors may be used to capture sensor data for the item 202. In some embodiments, the sensor may include, for example, a three-dimensional camera 210. In other embodiments, the sensor may include a scale (not pictured) or user input that is received through one or more input/output components associated a computing device. In some embodiments, the sensor may be associated with the computing device 110.

Figure 2B:
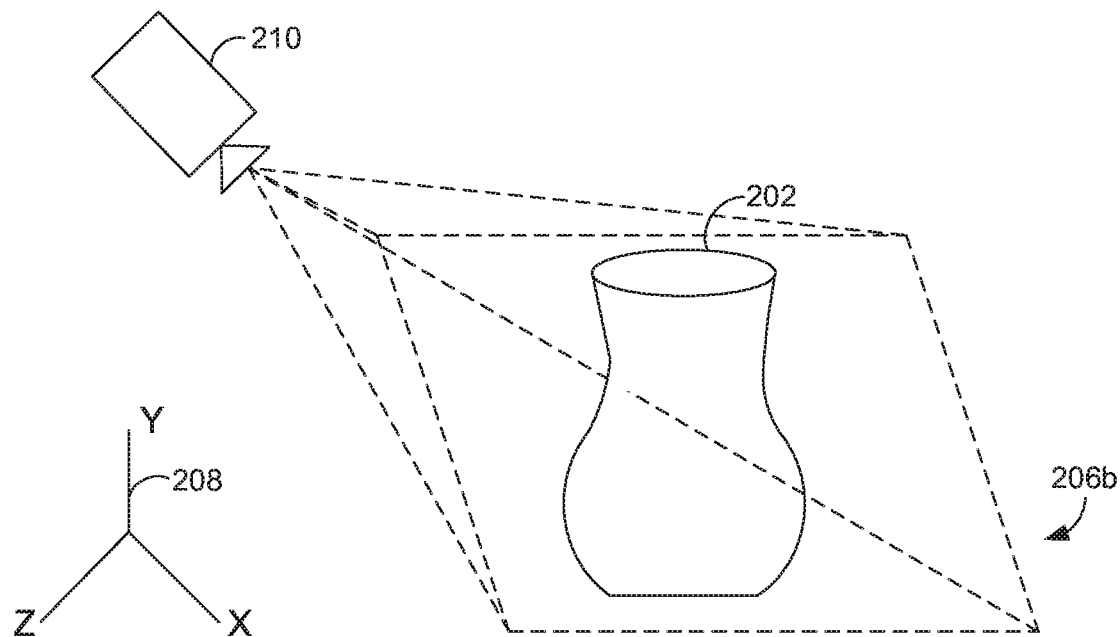

As shown in FIG. 2A, the three dimensional camera 210 may create one or more detection zones for capturing sensor data of the item 202. In some embodiments, a feature detection zone 206 (which in some embodiments may be referred to as a dimension detection zone) can be created by positioning one or more three-dimensional cameras 210 at various angles and positions along one or more axes of a three-dimension Cartesian coordinate system 208. The feature detection zone 206 may be fixed or altered based on arranging or altering the position of the one or more three-dimensional cameras 210 to capture different perspective views within the three-dimension Cartesian coordinate system 208. For instance, as shown in FIGS. 2A-B, a first feature detection zone 206a may be different from a second feature detection zone 206b.

In some embodiments, the position of the one or more three-dimensional cameras 210 may be changed. In one embodiment, the three-dimensional camera 210 may be pivotably attached to a first end of a support member (not shown) while the second end is pivotably attached to a base. The support member may be rotated throughout the three-dimension Cartesian coordinate system 208 such that the three-dimensional camera 210 captures different perspectives of the item 202. Additionally or alternatively, the three-dimensional camera 210 may be mobile (e.g., not physically attached to a support member), allowing a user to move the three-dimensional camera 210 freely throughout the Cartesian coordinate system 208 to capture one or more perspectives of the item 202. It should be appreciated that a plurality of images of the item 202 may be captured, either continuously or sequentially, so as to provide a basis for the three-dimensional dimensions for the item 202. Using a plurality of images of the item 202 may allow image recognition software to better identify the item 202 from sensor data. In some embodiments, image recognition software may detect dimensions for the item 202 from the sensor data based on multiple images.

In one embodiment, two or more three-dimensional cameras 210 are used to capture sensor data. The two or more three-dimensional cameras 210 may be positioned at different angles or axes within the three-dimensional Cartesian coordinate system 208 to capture different perspectives of the item 202 simultaneously. For instance, the two or more of three-dimensional cameras 210 may be positioned at substantially perpendicular angles or axes on the Cartesian coordinate system 208. By using multiple three-dimensional cameras 210, embodiments may capture a plurality of images of the item 202 simultaneously. The image recognition software may use the generated dimensions from a first image and compare it to the generated dimensions from a second image to confirm of the dimensions generated from the first image.

In some embodiments, the sensor data from the three-dimensional camera 210 may be used to generate dimensions for the item 202. This can be achieved, for example, by using image recognition software. For example, multiple captured images from the three-dimensional camera 210 may be processed by the image recognition software to render a complete three-dimensional model and its associated dimensions. This may eliminate errors associated with a manual process of entering dimensional data through user input.

In one embodiment, sensor data of the item 202 may be used to identify the item to be shipped. Computer image recognition software may identify the item based on one or more detectable features. For example, the item 202 can be identified as a vase based on its shape or dimensions. In some embodiments, the image recognition software can compare the detectable features to features stored within a database to identify the item. For example, the item 202 may be identified as vase based on pre-determined dimensions or shape. In some embodiments, the image recognition software utilizes artificial intelligence or machine learning models to identify the item from the sensor data.

In some embodiments, item-specific characteristics are determined. These may be obtained, for example, through the one or more sensors and/or, entered by a user through the one or more input/output components associated with the computing device. Item-specific characteristics may include identification of an item's materials such as weather the item is made of plastic, wood, glass, porcelain, metal, or otherwise. In some embodiments, the item-specific characteristic may be refined dimensions of the item that are determined based on a plurality of images taken at different angles, as discussed above. In some embodiments, the item-specific characteristics may relate to a product description, a product model number, a fragility level, a weight, a condition of the item, or carrier instructions/guidelines for the item. For example, the item-specific characteristic may be a model number for a cell phone. Image recognition software can detect the model number so as to retrieve the proper packaging instructions for that particular model of cell phone.

Figure 3:
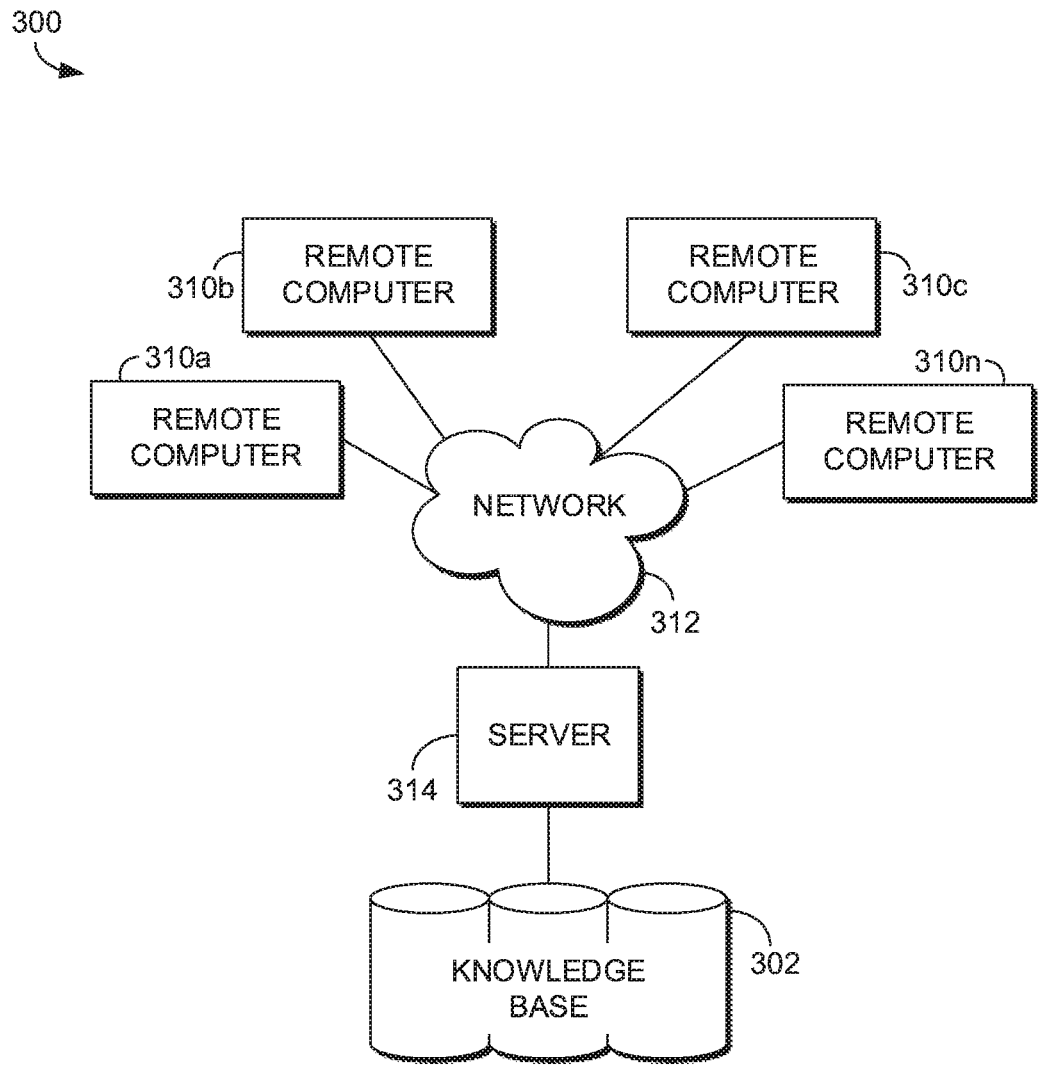
FIG. 3 is an exemplary operating environment, in accordance with embodiments described herein.

FIG. 3 depicts an exemplary operating environment 300 for embodiments described herein. A knowledge base 302 may be accessible by one or more computing devices 310a-n through a network 312 via a control server 314. In embodiments, network 312 includes the Internet, and/or one or more public networks, private networks, other communications networks such as a cellular network, or similar network (s) for facilitating communication among devices connected through the network. Network 312 may be determined based on factors such as the source and destination of the information communicated over network 312, the path between the source and destination, or the nature of the information. For example, intra-organization or internal communication may use a private network or virtual private network (VPN). Although the internal components of the control server 314 are not shown, its components and their interconnection are well known. Accordingly, additional details concerning the internal construction of the control server 314 are not further disclosed herein. In some embodiments, the one or more computing devices 310a-n may be the computing device 100 of FIG. 1.

Continuing with FIG. 3, in some embodiments, two or more item-specific characteristics may be applicable to a specific item. In this circumstance, the processor will identify the conflict (multiple item-specific characteristics being applicable) by consulting the knowledge base 302. In some embodiments, the knowledge base 302 includes one or more data stores of alternative packaging instructions, which may be stored in computer memory, and may further include one or more computers or servers that facilitate the storing and retrieval of the packaging instructions linked to item-specific characteristics. The knowledge base 302 may also store a database of items and item-specific characteristics. In some embodiments, the knowledge base 302 may store pre-populated detectable features that are linked to the item-specific characteristics.

With reference to FIG. 3, in some embodiments, the knowledge base 302 may be implemented as a cloud-based platform. In some embodiments, the knowledge base 302 is stored locally at the computer 310n. It should be appreciated that the knowledge base 302 can be a proprietary knowledge base that is only accessible through certain systems and/or individuals, such as those that are associated with a specific logistics carrier. In some embodiments, the knowledge base is accessible to all individuals.

Figure 4:
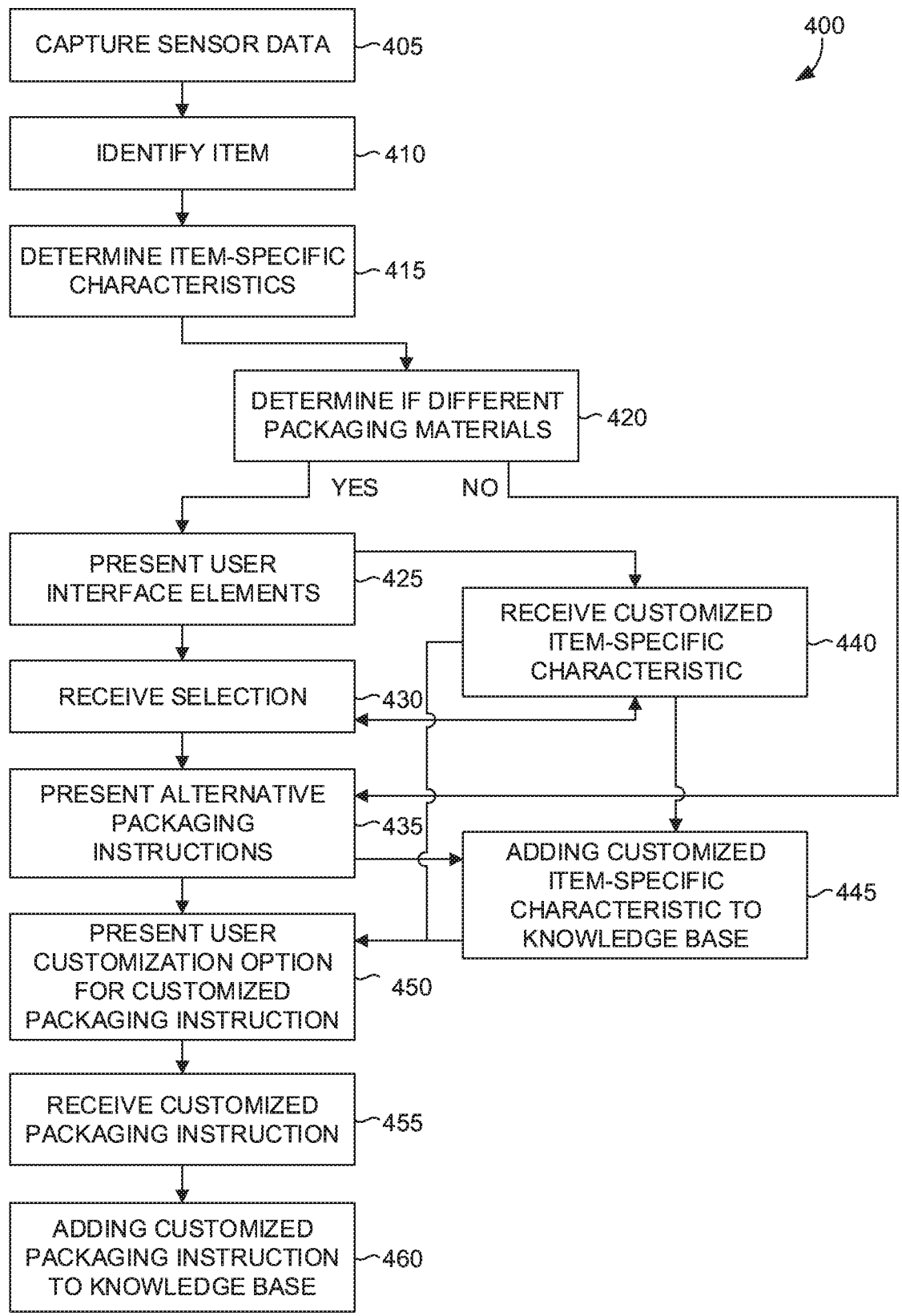
FIG. 4 is an exemplary block diagram of a method of packaging an item, in accordance with embodiments described herein.

Turning now to FIG. 4, a block diagram 400 of a method of determining packaging instructions is shown in accordance with embodiments described herein. At block 405, sensor data is captured of an item using one or more sensors. In some embodiments, sensor data is captured while the item is within a feature detection zone.

At block 410, the item can be identified. In some embodiments, the one or more detectable features may be used to identify the item. In some embodiments, the detectable features include dimensions of the item. The detectable features can also include logos, identification numbers, bar codes, shapes, or material properties, which can be used to identify the item. Using image recognition software, one or more detectable features can be determined from the sensor data so as to identify the item. For example, the processor may determine that the dimensions of the item are associated with dimensions of a cell phone. As a further example, the shape of an item may be determined to be associated with a shape of a vase. In yet another example, the sensor data may include an identification number, such as model number or a serial number. The identification number can then be used identify the item.

Item-specific characteristics can be determined at block 415. Generally, the term item-specific characteristic relates to a characteristic of an item that may requires particular packaging materials. Item-specific characteristic may relate to a characteristic of the item that requires a particular internal or external packaging material. In some embodiments, an item may be associated with different item-specific characteristics. For instance, an item may be associated with different material types. In the example above, if an item is a vase, the vase may be associated with different material types, such as glass, plastic, or porcelain. Other examples of an item-specific characteristic include whether an item has one or more electrical components. For example, the item-specific characteristic may be associated with whether the item contains a battery or electronic chip.

In some embodiments, item-specific characteristics can be determined based on the sensor data. For example, if the sensor data includes an identification number, such as an International Standard Book Number (ISBN), item-specific characteristics for a book can be determined, such as whether the book is a hardback or paperback.

In some embodiments, the item-specific characteristic is associated with an undetectable feature. For example, the feature may not be detectable by image recognition software when analyzing the sensor data. This may be due in part to the sensor data being poor in quality. Additionally or alternatively, the feature may not be detectable because it is hidden and cannot be captured by the one or more sensors. For example, if an item is a laptop computer, the undetectable feature may be a battery. While most laptop computers include a battery, there may be instances in which the laptop is being shipped without the battery.

Additionally or alternatively, the feature may not be detectable because it may be an aspect of the item that cannot be detected using image recognition software. For example, in some embodiments, the undetectable feature of an item may be the item's material type. Continuing the example from above, if the item is a vase, image recognition software may not be able to detect whether the vase is a glass vase or a plastic vase.

At block 420, it is determined whether any of the item-specific characteristics (including the undetectable feature) require different packaging materials. In some embodiments, a single item may be associated with multiple item-specific characteristics that each require a particular packaging material. In other words, in some embodiments, each item-specific characteristic may be associated with different packaging materials. For example, static resistance packaging material may be required for items having electronic components, while non-electrical components may not require static resistant packaging material. As a further example, a glass vase and a plastic vase may require different packaging materials as a plastic vase may require loose paper while a glass vase may require plastic bubble wrap. As such, a single item may require different packaging materials depending on the one or more item-specific characteristics. It should be appreciated that the term packaging material refers to any substance used in ensuring safe and economical transport of an item.

At block 425, a plurality of user interface elements are presented within a graphical user interface. In some embodiments, the user interface elements are associated with the one or more item-specific characteristics. Continuing with the example above, options of "glass vase" and "plastic vase" may be displayed within the graphical user interface as user interface elements. At block 430, a selection of an item-specific characteristic is received. In the example above, a selection of a user interface element associated with "glass vase" may be received.

At block 435, an alternative packaging instruction associated with the received selection of the item-specific characteristics may be presented within the graphical user interface. In some embodiments, the alternative packaging instructions identify packaging materials comprising an external packaging container and internal packaging material. In some embodiments, the alternative packaging instruction comprises multimedia directions comprising a workflow for packing the item.

The packaging instructions may be described as alternative packaging instructions as the item may be associated with different packaging instructions based on the item-specific characteristic. As described herein, in some embodiments, a single item may be associated with item-specific characteristics that require different packaging materials. As such, the item may be associated with alternative packaging instructions. By way of example, a vase may be associated with alternative packaging instructions based on whether it is a glass vase or a plastic vase. If the vase is a glass vase, the packaging instructions provided at block 435 may instruct using a larger outer packaging container so as to allow for a larger amount of inner packaging material (e.g., bubble wrap) to protect the glass vase from breaking during transit. Additionally or alternatively, if the vase is a plastic vase, the packaging instructions provide at block 435 may instruct using a smaller outer packaging container and a lower amount of inner packaging material than the glass vase. Additionally or alternatively, the inner packaging material may be different from the inner packaging material of the glass vase.

In some embodiments, the alternative packaging instructions can be associated with a workflow. In some embodiments, the workflow can be a sequential order of steps of how to pack an item. In some embodiments, the alternative packaging instructions may include a workflow that is associated with the packaging materials that are specific to the selected item-specific characteristic.

As mentioned, in some embodiments, the alternative packaging instructions associated with the selected item-specific characteristic is presented. The packaging instructions may be presented in one or more formats. In some embodiments, the alternative packaging instructions may include written step-by-step recommendations. In some embodiments, the alternative packaging instructions may include an illustration. For example, the illustration may depict how the item is to be wrapped with internal packaging material and inserted into an external packaging container. In further embodiments, the packaging instructions may include a video demonstration of how to wrap the item to be shipped.

In some embodiments, at block 440, the item-specific characteristic may be customized. In some embodiments, a user customization option is presented so as to receive user submission of a customized item-specific characteristic. For example, the user interface elements presented at block 425 may be associated with item characteristics such as plastic or glass. A user in this example may select a customization option so as to input a customized item-specific characteristic of "crystal." In some embodiments, the customized item-specific characteristic received at block 440 may be added to the knowledge base at block 445. Adding the customized item-specific characteristic may include an approval process. For example, an administrator may approve the customized item-specific characteristic. Adding the customized item-specific characteristic to the knowledge base allows the knowledge base to be expanded or improved, allowing packaging instructions for the customized item-specific characteristic to be generated. This provides constant feedback and enhancements for expanding knowledge base so as to account for items having distinct item-specific characteristics. Once added, the packaging instructions for the customized item-specific characteristic can be added.

In some embodiments, in response to receiving a customized item-specific characteristic, a user customization option for entering new packaging instructions is presented at step 450. In some embodiments, the plurality of user interface elements includes a user customization option for customizing the internal packaging material or the exterior packaging material for the newly created customized item-specific characteristic.

In some embodiments, at block 450, a customization option may be presented for modifying an alternative packaging instruction associated with an existing item-specific characteristic. To describe this differently, a user may choose to customize the one or more alternative packaging instructions associated with an existing item-specific characteristic. If the user does not agree with the packaging instructions for a particular item, the graphical user interface may allow the user to enter different instructions or packaging materials. For example, the user interface elements presented at block 425 may be associated with a plastic vase or a glass vase. If the user is not satisfied with the packaging instructions for a glass vase, the user may select the customization option to customize the existing packaging instructions for the glass vase.

At block 455 the customized packaging instruction is received via the graphical user interface. In some embodiments, the user may customize the workflow or the one or more packaging materials used in packing the item having the particular item-specific characteristic. For example, a workflow of text and images may be presented as to how a glass vase should be packaged with bubble wrap. A customization option may be presented to receive customized packaging instructions, such as a suggestion to use polystyrene foam instead of bubble wrap. As a further example, the customization option may receive customized packaging instructions to increase the amount of bubble wrap used in the packaging of a glass vase. The customization of packaging instructions can be helpful to update, change, or present more effective packaging instructions for an item.

While not shown, a user may customize packaging instructions for new items. For example, a user may submit suggestions to pack a new item that is not stored within the knowledge base. In this example, the user may be prompted to enter the item. Next, the user may be prompted to enter an item-specific characteristic at block 440. Additionally or alternatively, the user may be prompted to enter customized packaging instructions for the new item at block 450. In turn, the customized packaging instructions are received at block 455.

At block 460, the customized packaging instruction may be added to the knowledge base. The customized packaging instruction may have to be approved by an approval system.

For example, an administrator may approve the customized packaging instructions. In some embodiments, the approval system may include requiring a predetermined number of users to approve the customized packaging instructions. Once added, the knowledge base becomes more robust, providing packaging instructions to subsequent users.

Figure 5B:
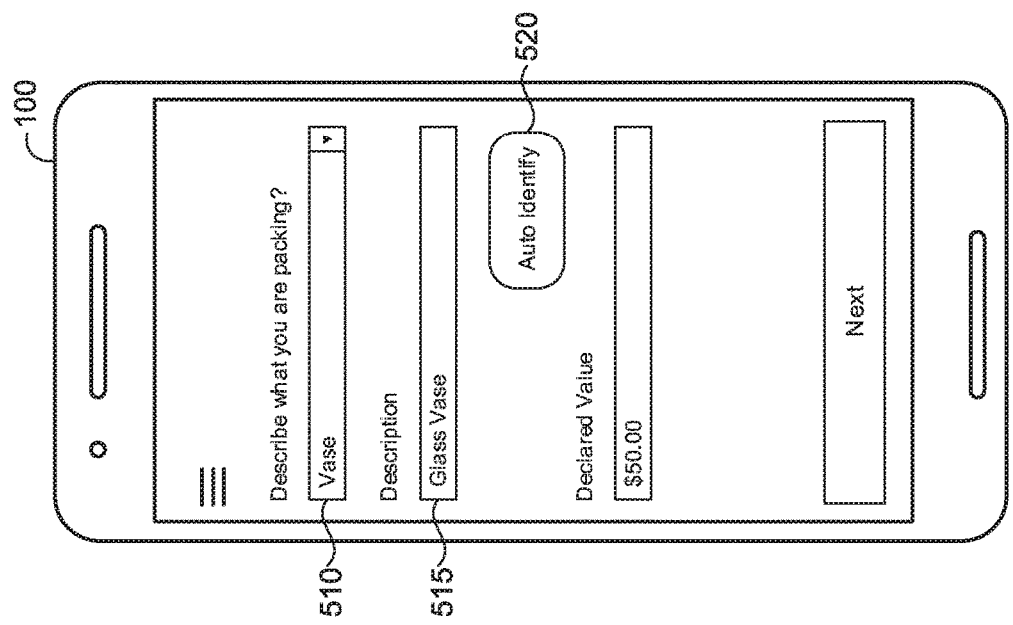
FIG. 5B is an exemplary graphical user interface for input of various elements, in accordance with embodiments described herein.
Figure 5A:
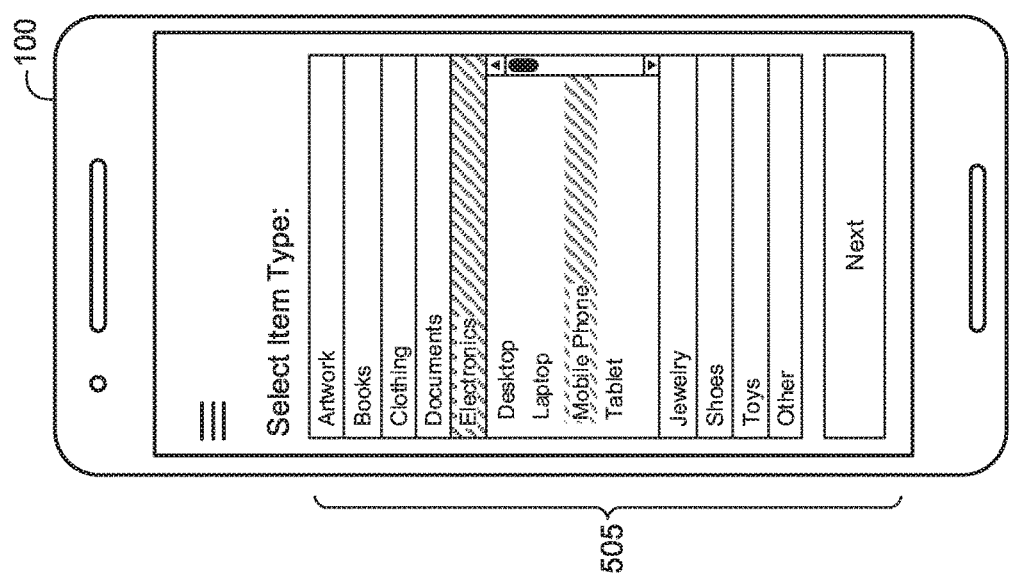
FIG. 5A is an exemplary graphical user interface for manual selection of an item and item-specific features, in accordance with embodiments described herein.

FIGS. 5A-B illustrate an exemplary graphical user interface on a computing device 100. FIG. 5A displays how a user may manually select an item to be shipped. For example, a user may select an item from a dropdown menu 505 on a graphical user interface. FIG. 5B displays another graphical user interface for manually selecting the item via a dropdown menu 510. A user may manually input an item-specific characteristic at item 515. The graphical user interface also provides an auto identify selectable element 520 that may launch image recognition software to automatically identify the item-specific characteristic.

Figure 6:
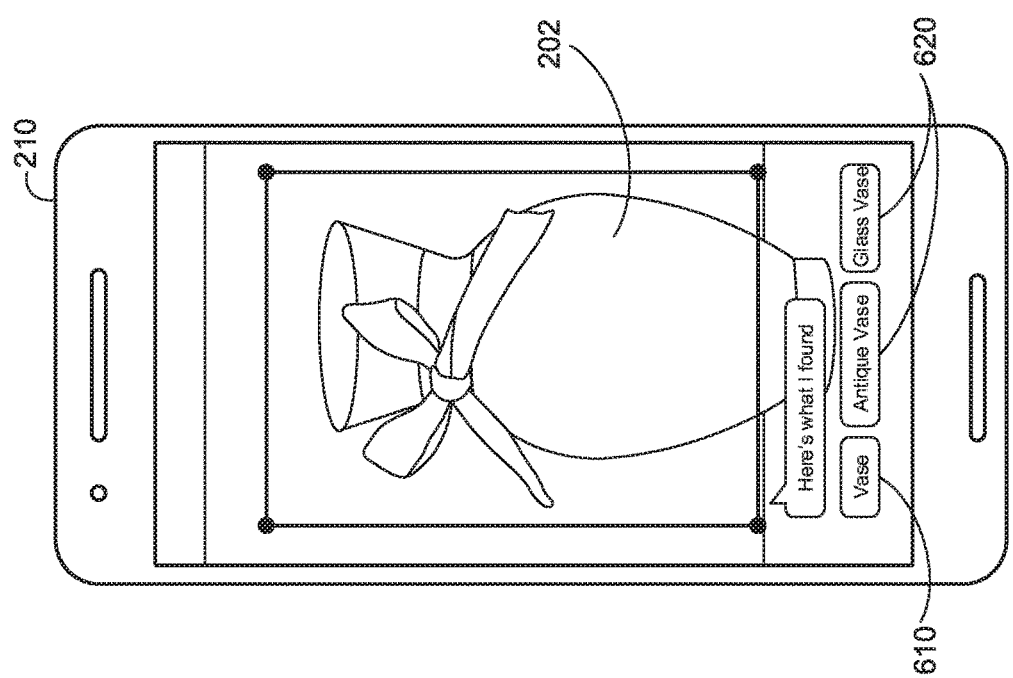
FIG. 6 is an exemplary graphical user interface of a plurality of user interface elements, in accordance with embodiments described herein.

FIG. 6 illustrates one embodiment of using a computing device 100 equipped with a sensor. In some embodiments, the sensor may be a three-dimensional camera on the back of the computing device, such as computing device 100. The sensor can be used to capture sensor data of an item. The sensor data can then be used to identify the item and item-specific characteristics. In some embodiments, image recognition software may utilize detectable features to identify the item. A description of the item can then be presented on the graphical user interface as a graphical user interface element, as shown at element 610. Further, the graphical user interface may present one or more item-specific characteristics of the item. In some embodiments, the presentation of multiple item-specific characteristics comprises presenting a plurality of user interface elements. Each of the graphical user interface elements 610 and 620 may be selectable. In some embodiments, graphical user interface elements 610 and 620 are associated with undetectable features.

Figure 7B:
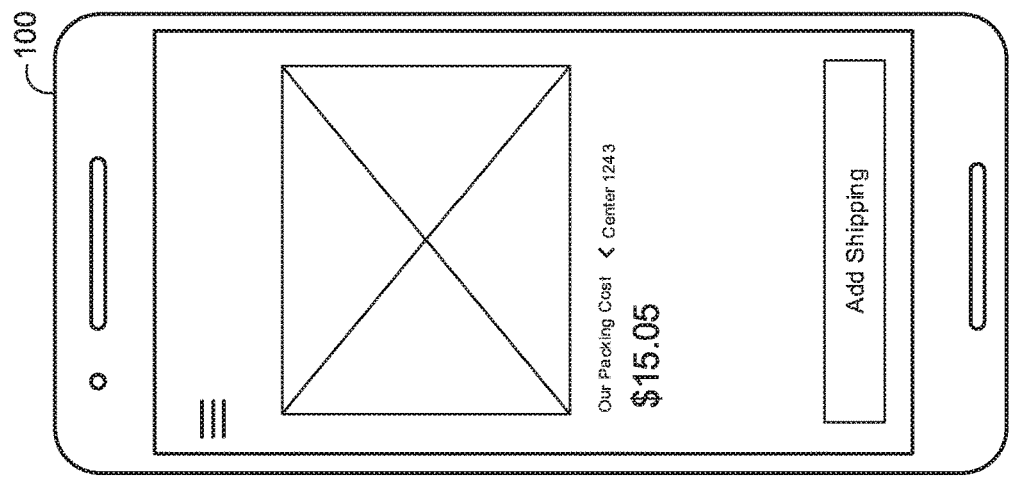
FIG. 7B is an exemplary graphical user interface for display of a quote of shipping cost based on location, in accordance with embodiments described herein.
Figure 7A:
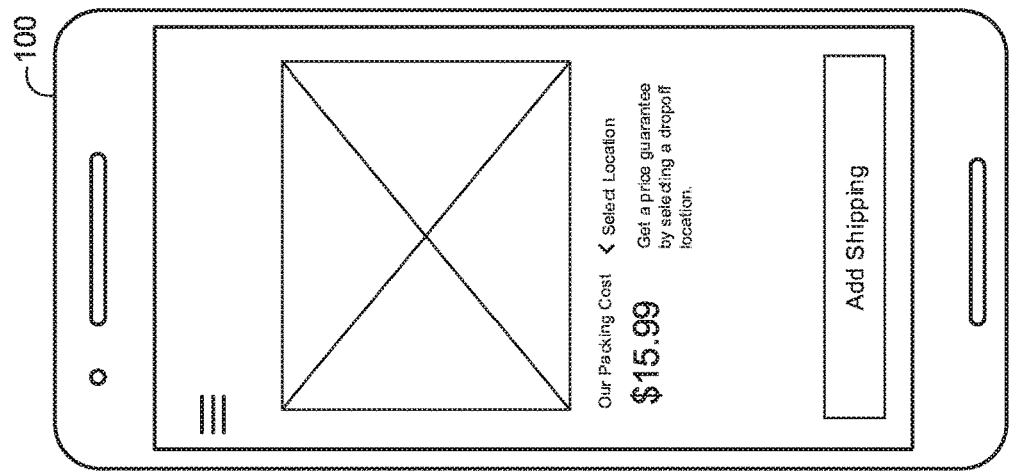
FIG. 7A is an exemplary graphical user interface for display of a shipping cost, in accordance with embodiments described herein.

FIGS. 7A and 7B illustrate one embodiment of an exemplary graphical user interface of a computing device 100. In example embodiments, a user may generate a quote for shipping an item that is to be packed. By employing the embodiments described herein, the computing device 100 may be improved by generating a more accurate cost for shipping the item. For example, a three-dimensional camera associated with the computing device 100 can capture and process the sensor data to determine the item's 202 dimensions, as discussed above. In addition, the user may enter any further defining characteristics of the item as instructed by the workflow process. The computing device 100 may then search the knowledge base. In one embodiment, the computing device 100 will retrieve the alternative packaging instructions and any associated cost with the packaging materials so as to generate the quote for shipping the item. In a further embodiment, the user may select a particular drop-off location associated with a carrier so as to allow the computing device 100 to determine an even more accurate quote for shipping the item. This may be achieved, for example, since the computing device 100 may interact with a remote server associated with the carrier so as to retrieve all costs associated with shipping the item from that particular drop-off location, including any site-specific costs of packaging material or service fees. FIG. 7A displays a price guarantee that may be shown generally while requesting a drop-off location, and FIG. 7B displays a more accurate cost as a quote based on the particular drop-off location. As used herein, the drop-off location may be any physical location. In some embodiments, the drop-off location may be a carrier's store front.

In some embodiments, the user may accept the quote generated by the computing device 100 shown in FIG. 7B and receive a confirmation code or token (e.g., a QR code). In one embodiment, this is achieved by the computing device 100 communicating the user's acceptance with the remote server (e.g., server 314) associated with the carrier, which in turn, provides the computing device 100 with the confirmation code. This confirmation code may then be presented when the user drops off the item at the drop-off location. According to embodiments herein, the item can be packed according to the quoted price.

Embodiments may also allow for guaranteeing shipping insurance. For instance, shipping insurance may depend on packing the item according to the instructions provided by the knowledge base. So long as the packaging instructions are followed, coverage for any insurance claims pertaining to the item being damaged during transportation might be guaranteed by the insurer.

Figure 8:
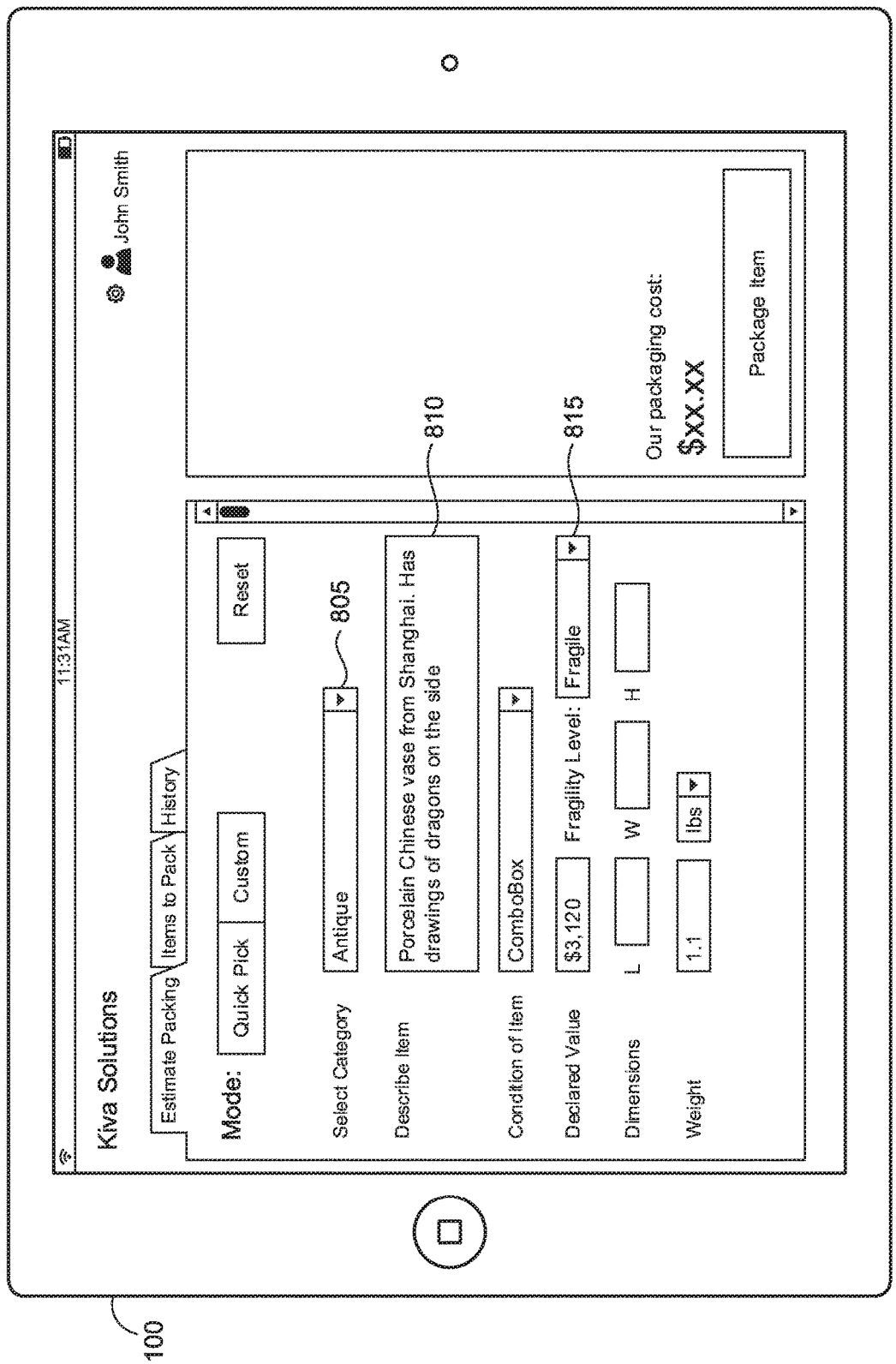
FIG. 8 is an exemplary graphical user interface for display of customization elements, in accordance with embodiments described herein.

FIG. 8 displays another graphical user interface on a computing device 100. A user may select the mode in which they would like to pack an item. A user may select the "custom" category to manually enter items such as the item from a drop down menu at item 805. A user may also elect to manually describe the item to give item-specific characteristics at item 810. Further, a user may manually describe the fragility level at graphical user interface element 815. In some embodiments, a user may have used sensors to capture sensor data of the item, which can be utilized by image recognition software to subsequently identify the item. For example, the image recognition software may rely on detected features within the capture sensor data to identify the item in the future.

Figure 9:
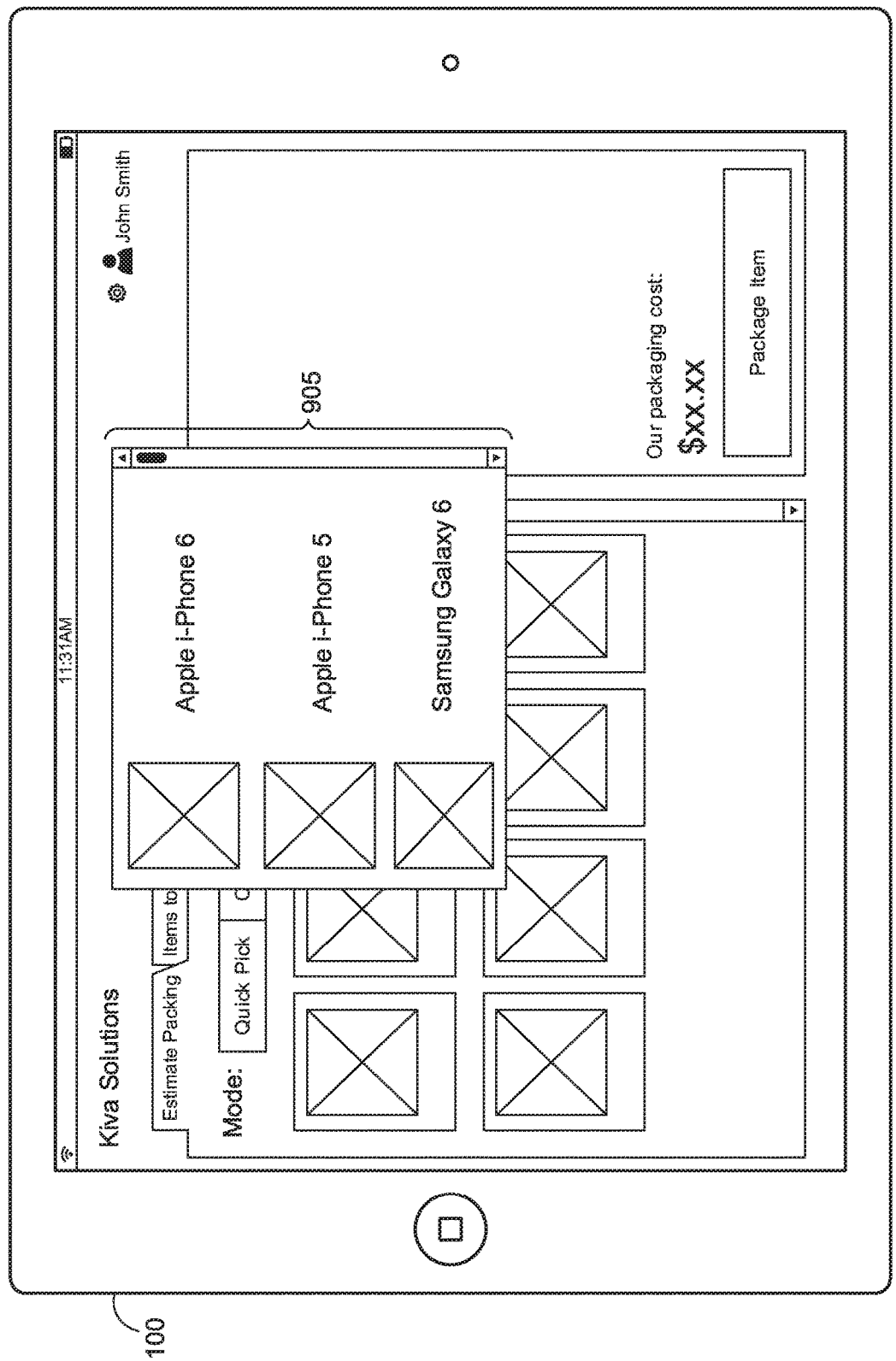
FIG. 9 is an exemplary graphical user interface for display of a plurality of user interface elements, in accordance with embodiments described herein.

FIG. 9 displays the same computing device 100 from FIG. 8, when a "quick pick" option is selected. In some embodiments, a user may select an item to be packaged. For example, a user may wish to package a cell phone. As a cell phone may have a plurality of different packaging instructions, a conflict between packaging instructions has been determined. Additionally or alternatively, a conflict may have been determined based on the sensor data of the cell phone. For example, the image recognition software may detect that the item is a cell phone. However, the exact model of cell phone may not have been detectable from the sensor data. As such, in some embodiments, several item-specific characteristics (e.g., different models of phone) may be presented as graphical user interface elements. The conflict has therefore lead to displaying a plurality of user interface elements shown at item 905. From these user interface elements, a user may select which item-specific characteristics match the item to receive the alternative packaging instructions. In some embodiments, the item-specific characteristic may be associated with different packaging instructions. For example, an iPhone® 6 may require different packaging materials than a Samsung Galaxy® 6 based on the two cell phones having different dimensions.

Figure 10:
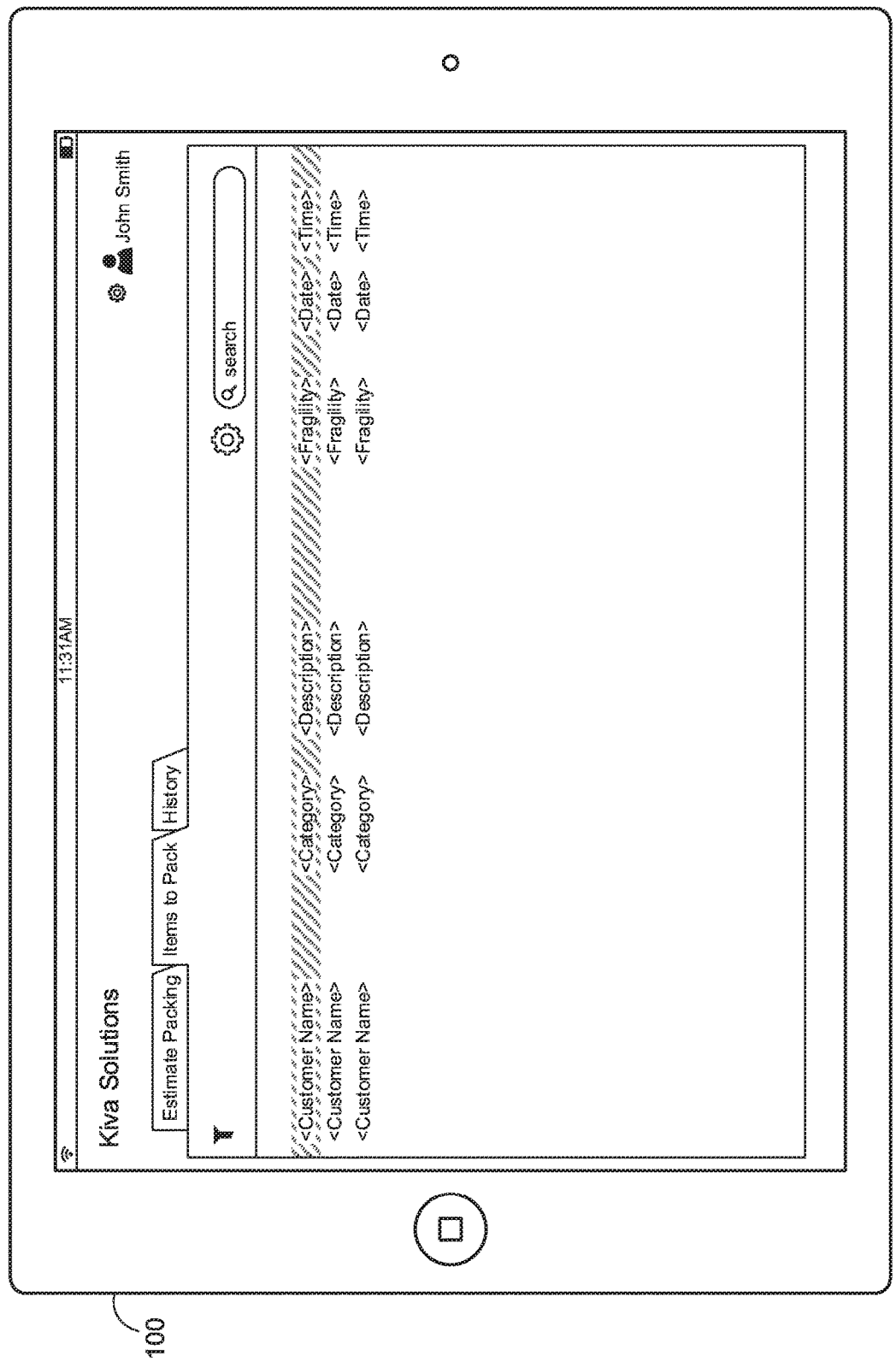
FIG. 10 is an exemplary graphical user interface for listing multiple items to be shipped, in accordance with embodiments described herein.

FIG. 10 displays the same computing device 100 of FIG. 8. Multiple objects may be listed on the graphical user interface. Each item can list the category of the item, the description (the item-specific characteristic), the date and time of shipment, and even a fragility of the item. A customer name may even be populated. Some of the fields described may be either populated using the methods described and/or manually input by a user.

Figure 11:
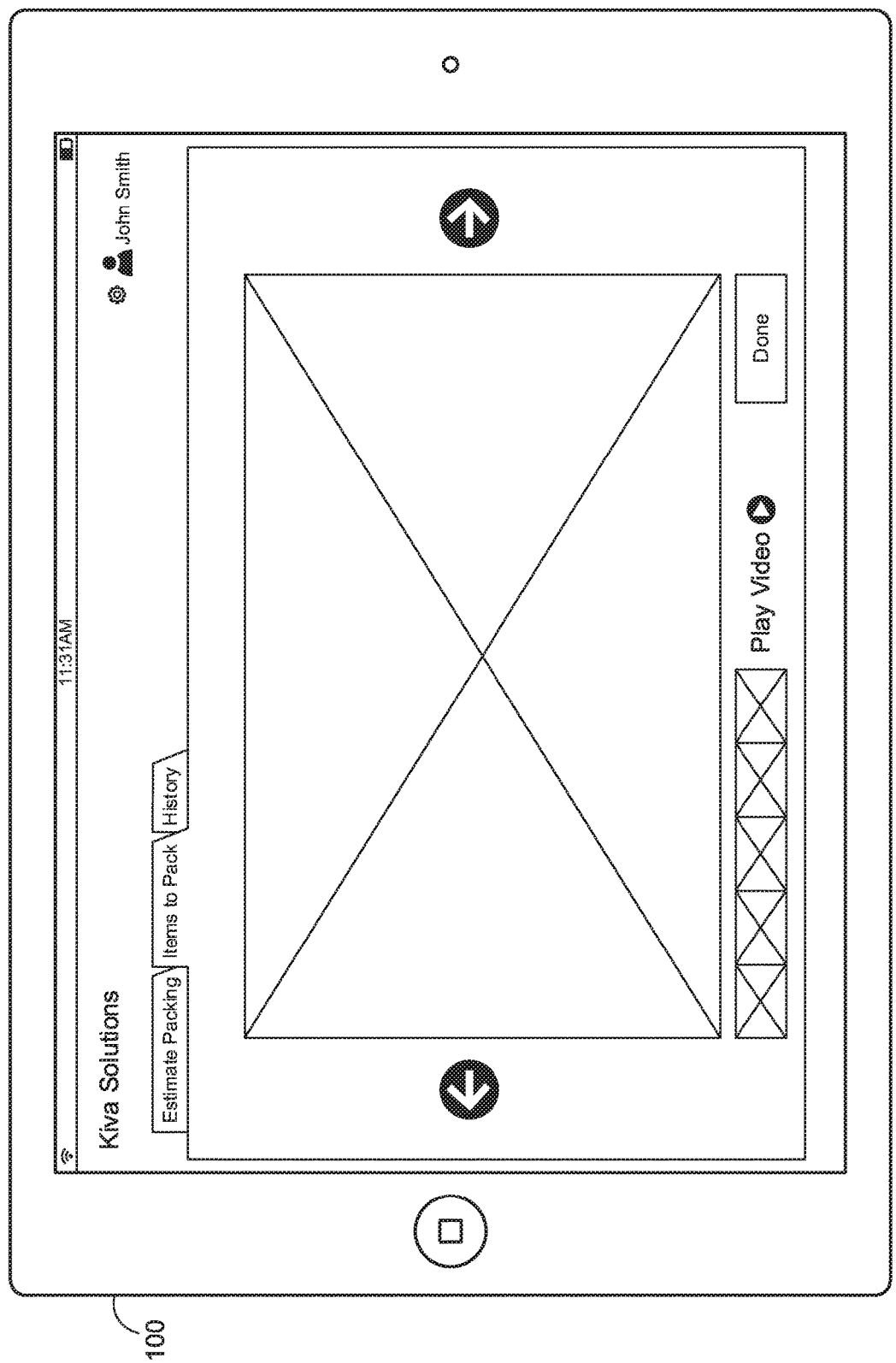
FIG. 11 is an exemplary graphical user interface for display of alternative packaging instructions, in accordance with embodiments described herein.

FIG. 11 displays the same computing device 100 of FIG. 8. The graphical user interface on the computing device 100 displays one embodiment of the alternative packaging instructions. Here, the alternative packaging instructions may be in a multimedia format, such as a video to be played on the screen. The multimedia may also be a series of photographs or written instructions. In this way, the alternative packaging instructions can be provided to a user so as to improve how the item is packaged. In some embodiments, several sets of alternative packaging instructions may be displayed at the same time, or queued to be displayed, if multiple items 202 are to be shipped.

The present technology has been described in relation to particular embodiments, which are intended in all respects to be illustrative rather than restrictive. Alternative embodiments will become apparent to those of ordinary skill in the art to which the present technology pertains without departing from its scope. Different combinations of elements, as well as use of elements not shown, are possible and contemplated. It will be understood that certain features and sub-combinations are of utility and may be employed without reference to other features and sub-combinations. This is contemplated by and is within the scope of the claims.

The invention claimed is:

1. A method for preparing items to be shipped in a logistics network, the method comprising:
    receiving an image of an item captured by a three-dimensional camera;
    based on the captured image, determining, via the processor, a packaging instruction associated with the item;
    based on the captured image, detecting, via the processor, a plurality of item-specific characteristics associated with the item, wherein the plurality of item-specific characteristics are associated with alternative packaging instructions that utilize different packaging materials;
    determining, via the processor, a conflict exists between the packaging instruction and the alternative packaging instructions associated with the detected item-specific characteristics;
    causing for display, within a graphical user interface, a plurality of user interface elements for the plurality of item-specific characteristics;
    determining a selected item-specific characteristic based on receiving a selection of a user interface element from the plurality user interface elements;
    retrieving from a knowledge base, via the processor, the alternative packaging instruction associated with the selected item-specific characteristic; and
    causing the alternative packaging instructions for the item to be displayed.

2. The method of claim 1, wherein the alternative packaging instructions further comprise multimedia directions comprising a workflow for packing the item.

3. The method of claim 1, wherein the plurality of item-specific characteristics is associated with an undetectable feature of the item.

4. The method claim 1, further comprising receiving customized packaging instructions for the item associated with the selected item-specific characteristic, wherein the customized packaging instruction identifies suggested packaging materials for the item.

5. The method of claim 4, further comprising adding the customized packaging instruction to the knowledge base.

6. The non-transitory computer readable medium of claim 1, further comprising:
    presenting, within the graphical user interface, a user customization option for user submission of a customized packaging instruction, wherein the customized packaging instruction comprises one or more packaging materials, and
    receiving, via the graphical user interface, the customized packaging instruction.

7. The non-transitory computer readable medium of claim 6, further comprising, adding the user customization option of the item-specific characteristic to the knowledge base.

8. The non-transitory computer readable medium of claim 6, wherein the item-specific characteristic is associated with a material type.

9. The non-transitory computer readable medium of claim 6, wherein the item-specific characteristic is associated with an undetectable feature.

10. The non-transitory computer readable medium of claim 6, wherein sensor is a three-dimensional camera.

11. A system for preparing items to be shipped comprising:
    a knowledge base comprising a plurality of alternative packaging instructions for an item, each of the plurality of alternative packaging instructions being associated with an item-specific characteristic, wherein each of the plurality of alternative packaging instructions comprises a particular workflow for a particular packaging material; and
    one or more non-transitory computer-readable media having computer-executable instructions embodied thereon, the instructions comprising:
    receiving, from a sensor, sensor data of the item to be packaged,
    identifying, from the sensor data, the item based on one or more detectable features,
    determining that the item is associated with a plurality of the item-specific characteristics requiring conflicting packaging materials,
    presenting, within a graphical user interface, a plurality of user interface elements associated with the plurality of the item-specific characteristics,
    receiving a selection of one of the plurality of the item-specific characteristics via one of the group of user interface items; and
    presenting, within the graphical user interface, an alternative packaging instruction associated with the particular workflow and the particular packaging material corresponding to the received selection of the one of the plurality of the item-specific characteristics.

12. The system of claim 11, wherein the packaging materials comprise an external packaging container and an internal packaging material, the external packaging container having an opening and an internal chamber.

13. The system of claim 11, wherein the plurality of user interface elements further comprise:
    a user customization option for user submission of a customized item-specific characteristic; and
    the packaging instructions displayed relate to one of the plurality of the item-specific characteristics.

14. The system of claim 13, wherein the processor is configured to submit the user customization option of the item-specific characteristic to the knowledge base to be added as an item-specific characteristic.

15. The system of claim 11, wherein the graphical user interface is further configured to receive a customized packaging instruction related to the plurality of user interface elements.

16. The system of claim 15, wherein the processor is configured to submit the customized packaging instructions to the alternative packaging instructions on the knowledge base.

17. The system of claim 11, wherein the detectable features further comprise determining dimensions of the item from the sensor data.

18. The system of claim 11, wherein the item-specific characteristics further comprise determining at least one of a logo, a material property, a weight, or an identification code from the sensor data.

19. A non-transitory computer-readable storage medium having a computer program embodied thereon, the program executable to perform a method for preparing items to be shipped, the method comprising:

- capturing, from a sensor, sensor data of an item to be packaged;
- identifying, from the sensor data, the item based on one or more detectable features, wherein the identification of the item includes matching the one or more detectable features with one or more item characteristics stored within a knowledge database;
- determining that the item is associated with a plurality of item-specific characteristics that require different packaging materials;
- presenting, within a graphical user interface, a plurality of user interface elements comprising the plurality of the item-specific characteristics;
- receiving, via the graphical user interface, a selection of one of the plurality of item-specific characteristics;
- presenting, within the graphical user interface, an alternative packaging instruction associated with the received selection of the one of the plurality of item-specific characteristics, where the alternative packaging instruction identifies packaging materials comprising an external packaging container and an internal packaging material.

20. The non-transitory computer readable medium of claim 19, wherein:

- the plurality of user interface elements comprises a user customization option of the item-specific characteristic, and
- the presented alternative packaging instructions are associated with a particular workflow and a particular packaging material that are both specific to the selected item-specific characteristic.

* * * * *

UNITED STATES PATENT AND TRADEMARK OFFICE
CERTIFICATE OF CORRECTION

PATENT NO. : 11,574,376 B2
APPLICATION NO. : 16/279651
DATED : February 7, 2023
INVENTOR(S) : McAllister et al.

It is certified that error appears in the above-identified patent and that said Letters Patent is hereby corrected as shown below:

In the Claims

- Column 13, Line 57: In Claim 4, after "method" insert --of--.
- Column 13, Line 64: In Claim 6, delete "non-transitory computer readable medium" and insert --method--.
- Column 14, Line 6: In Claim 7, delete "non-transitory computer readable medium" and insert --method--.
- Column 14, Line 9: In Claim 8, delete "non-transitory computer readable medium" and insert --method--.
- Column 14, Line 12: In Claim 9, delete "non-transitory computer readable medium" and insert --method--.
- Column 14, Line 15: In Claim 10, delete "non-transitory computer readable medium" and insert --method--.

Signed and Sealed this
Fourth Day of April, 2023

Katherine Kelly Vidal
*Director of the United States Patent and Trademark Office*